United States Patent
Gonion (10) Patent No.: US 8,446,426 B2
(45) Date of Patent: May 21, 2013

(54) TECHNIQUE FOR VISUALLY COMPOSITING A GROUP OF GRAPHICAL OBJECTS

(75) Inventor: Jeffry E. Gonion, Campbell, CA (US)

(73) Assignee: Apple Inc., Cupertino, CA (US)

(*) Notice: Subject to any disclaimer, the term of this patent is extended or adjusted under 35 U.S.C. 154(b) by 1130 days.

(21) Appl. No.: 12/110,866

(22) Filed: Apr. 28, 2008

(65) Prior Publication Data

US 2009/0267959 A1    Oct. 29, 2009

(51) Int. Cl.
    *G09G 5/02*    (2006.01)
(52) U.S. Cl.
    USPC ........................... 345/592; 345/629
(58) Field of Classification Search
    USPC ................................ 345/592, 629
    See application file for complete search history.

(56) References Cited

U.S. PATENT DOCUMENTS

| 5,459,529 | A | 10/1995 | Searby et al. | |
|---|---|---|---|---|
| 5,923,791 | A | 7/1999 | Hanna et al. | |
| 6,400,374 | B2 | 6/2002 | Lanier | |
| 7,102,651 | B1 * | 9/2006 | Louveaux et al. | 345/629 |
| 7,720,312 | B2 * | 5/2010 | Maier et al. | 382/302 |
| 2005/0017986 | A1 * | 1/2005 | Anwar et al. | 345/629 |
| 2008/0094411 | A1 * | 4/2008 | Parenteau et al. | 345/592 |

* cited by examiner

*Primary Examiner* — Maurice L McDowell, Jr.
(74) *Attorney, Agent, or Firm* — Wong, Cabello, Lutsch, Rutherford & Brucculeri LLP.

(57) ABSTRACT

Embodiments of a method for visually compositing a group of objects in an image are described. During operation, a processor determines a modified opacity for a first object in a first group of objects based on a first group opacity for the first group of objects and an initial opacity for the first object in the first group of objects. Then, the processor determines a modified opacity for a second object in the first group of objects based on the modified opacity for the first object in the first group of objects and an initial opacity for the second object in the first group of objects, where the modified opacity for the first object in the first group of objects and the modified opacity for the second object in the first group of objects are used to composite the first group of objects.

21 Claims, 4 Drawing Sheets

TECHNIQUE FOR VISUALLY COMPOSITING A GROUP OF GRAPHICAL OBJECTS

BACKGROUND

1. Field of the Invention

The present invention generally relates to techniques for processing graphical objects. More specifically, the present invention relates to a technique visually compositing one or more groups of objects in an image.

2. Related Art

Modern graphics processing units (GPUs) are configured to perform visual composite graphical objects in an image. During this compositing, when two or more of these graphical objects overlap, a GPU may determine an opacity for each overlapping object (which is sometimes referred to as alpha or an alpha value) that varies on a pixel-by-pixel basis.

However, when compositing multiple objects that overlap, semi-transparency of a group of composited objects may necessitate a second compositing operation. In particular, the GPU may first composite the objects based on the initial opacities of the objects. Subsequently, in order to cause the group to appear semi-transparent, the second compositing operation may be required to blend the group composition with any background.

For example, the image may include a fanned deck of cards, where each of the cards is a graphical object, and where a given card may at least partially obscure a portion of a card below it. Visually compositing the fanned deck of cards, as a group, on the image background is not a problem so long as the deck is opaque. However, if the deck is faded in or faded out as a group, the second compositing operation may be needed, because simply changing the opacity of each card will allow otherwise obscured portions of subsequent cards to bleed through the upper cards.

Unfortunately, this second compositing operation may delay the rendering of the image. Additionally, the second compositing operation may: consume GPU resources, increase memory usage, and/or increase bandwidth requirements.

Hence, what is needed is a technique that facilitates visual compositing of a group of graphical objects without the above-described problems.

SUMMARY

One embodiment of the present invention provides a method for visually compositing a group of objects (such as graphical objects) in an image. During operation, a processor determines a modified opacity for a first object in a first group of objects based on a first group opacity for the first group of objects in combination with an initial opacity of the first object in the first group of objects. Then, the processor determines a modified opacity for a second object in the first group of objects based on the modified opacity for the first object in the first group of objects in combination with an initial opacity of the of the second object in the first group of objects. Note that the modified opacity for the first object in the first group of objects and the modified opacity for the second object in the first group of objects are used to composite the first group of objects.

In some embodiments, the first object in the first group of objects is at least partially superimposed over the second object in the first group of objects in the image.

In some embodiments, the modified opacity for the first object in the first group of objects corresponds to a product of the initial opacity for the first object in the first group of objects and the first group opacity.

In some embodiments, the processor initializes the first group opacity to a maximum value.

In some embodiments, the modified opacity for the second object in the first group of objects corresponds to the difference between the first group opacity and the modified opacity for the first object in the first group of objects. For example, the modified opacity for the second object in the first group of objects may correspond to a product of the initial opacity for the second object in the first group of objects and the difference.

In some embodiments, the processor includes a graphics processing unit.

In some embodiments, the modified opacity for the first object in the first group of objects and the modified opacity for the second object in the first group of objects are additionally used to composite the first group of objects with a background in the image.

In some embodiments, the compositing of the first group of objects is performed without intermediate read and write operations associated with the determining of the opacities for multiple objects in the first group of objects.

In some embodiments, the processor defines the first group of objects.

In some embodiments, the processor determines a modified opacity for a first object in a second group of objects based on a modified second group opacity for the second group of objects, where the modified second group opacity is based on the first group opacity and an initial second group opacity for the second group of objects. Then, the processor may determine a modified opacity for a second object in the second group of objects based on the modified opacity for the first object in the second group of objects and an initial opacity for the second object in the second group of objects, where the modified opacity for the first object in the second group of objects and the modified opacity for the second object in the second group of objects are used to composite the second group of objects with the first group of objects.

In some embodiments, the modified second group opacity corresponds to a difference between a maximum opacity value and the first group opacity.

In some embodiments, the first object in the second group of objects is at least partially superimposed over the second object in the second group of objects in the image.

In some embodiments, the modified opacity for the second object in the second group of objects corresponds to the difference between the first group opacity, the modified second group opacity and an initial opacity for the second object in the second group of objects.

Another embodiment provides the processor, which includes an instruction fetch unit configured to fetch instructions corresponding to at least some of the preceding operations, and an execution unit configured to execute the instructions.

Another embodiment provides a computer system that includes the processor.

BRIEF DESCRIPTION OF THE FIGURES

Table 1 provides pseudo-code for processor instructions in accordance with an existing compositing technique.

Table 2 provides pseudo-code for processor instructions in accordance with an existing compositing technique.

Table 3 provides pseudo-code for processor instructions in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of a processor (such as a GPU), a computer system, and a technique for visually compositing a group of graphical objects in an image are described. In particular, these devices, systems, and techniques may facilitate single-pass visual compositing of one or more groups of graphical objects in the image by using object and group transparency effects, such as object opacities and group opacities. This approach may eliminate the need for intervening operations (such as a render-to-texture operation) and/or the storage of intermediate results, thereby reducing the delay in the rendering of the image and reducing the use of resources, such as: GPU resources, memory, and/or communication bandwidth.

While the following discussion uses a hardware implementation of the technique for visually compositing the group of graphical objects in the image as an illustrative example, in other embodiments, operations (or related instructions) are implemented in hardware and/or in software, as is known in the art. Moreover, in some embodiments the instructions are stored on a computer-readable storage medium, which may be any device or medium that can store code and/or data for use by a computer system. This includes, but is not limited to: volatile memory, non-volatile memory, magnetic and optical storage devices such as disk drives, magnetic tape, CDs (compact discs), DVDs (digital versatile discs or digital video discs), and/or other media capable of storing computer-readable media now known or later developed. Additionally, in some embodiments the visual compositing is performed by a software application or program module that is executed by the processor in the computer system (as described further below with reference to FIG. 3).

Figure 1A:
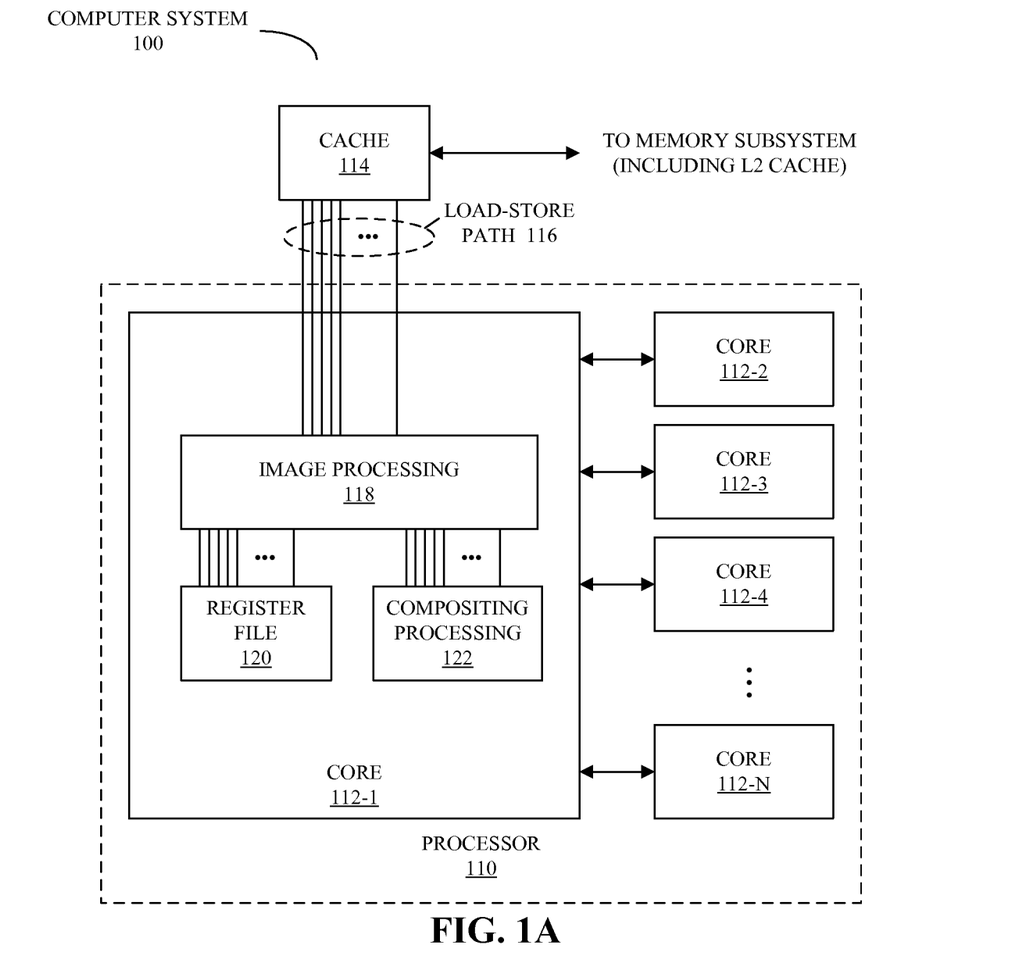
FIG. 1A is a block diagram illustrating a computer system in accordance with an embodiment of the present invention.

We now describe embodiments of a computer system that includes one or more processors. FIG. 1A presents a block diagram illustrating a computer system 100 in accordance with an embodiment of the present invention. Computer system 100 may generally include any type of computer system, including, but not limited to: a computer system based on a processor or microprocessor, a mainframe computer, a digital signal processor, a portable computing device, a personal organizer, a device controller, a cell phone, and/or a computational engine within an appliance.

Computer system 100 includes a processor 110, such as a central-processing unit (CPU) or a graphics processing unit (GPU), which performs computational operations. While performing these computational operations, processor 110 operates on data items retrieved from cache memory 114 via a load-store path 116. Note that cache memory 114 is coupled to a memory subsystem (not illustrated). In one embodiment of the present invention, cache memory 114 is a Level-One (L1) data cache which communicates with a memory subsystem that includes a Level-Two (L2) unified instruction/data cache and a main memory.

Processor 110 includes multiple cores 112. One or more of these cores 112 includes image-processing module 118 (for example, in an execution unit), which executes instructions for processing images. This processing may include visually compositing one or more groups of graphical objects in an image. In some embodiments, compositing-processing module 122 performs the visual compositing for image-processing module 118.

Moreover, image-processing module 118 may define and/or may receive definitions for the one or more groups of graphical objects (such as which graphical objects are included in a given group of graphical objects). This definition information may be stored or held in register file 120.

Figure 1B:
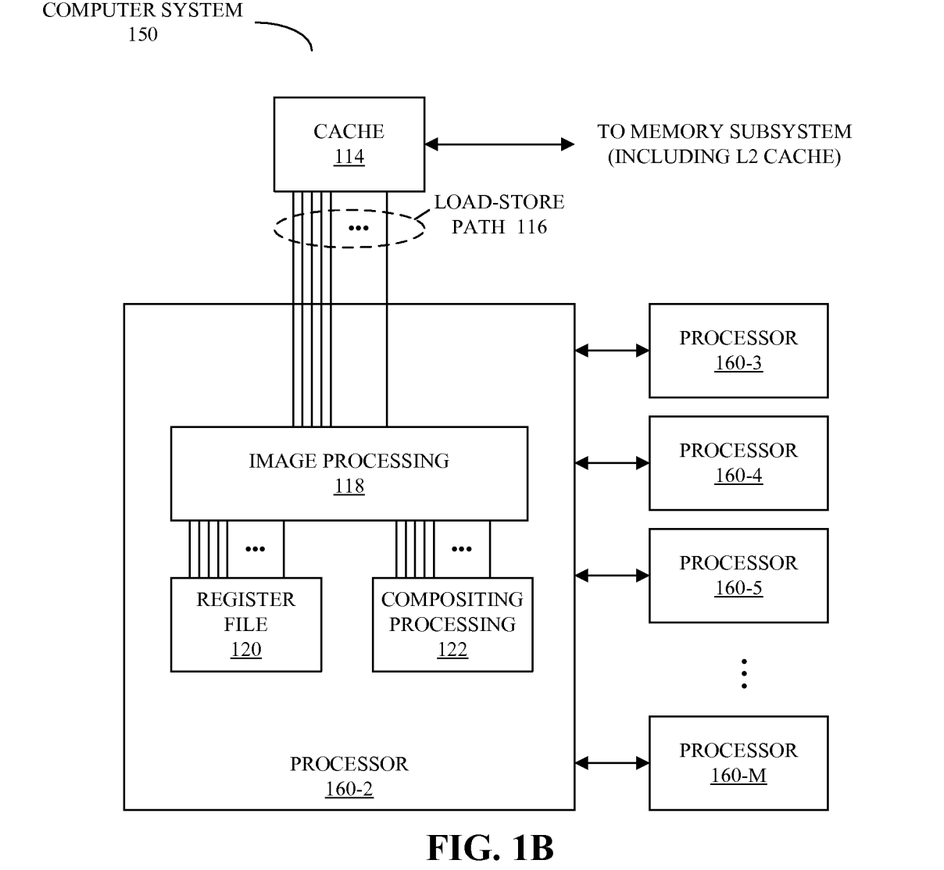
FIG. 1B is a block diagram illustrating a computer system in accordance with an embodiment of the present invention.

Furthermore, image-processing module 118 may assign portions of the image (such as the given group of graphical objects) to one or more of the cores 112 for processing. In some embodiments, this processing is implemented using multiple processors. This is illustrated in FIG. 1B, which presents a computer system 150 that includes processors 160 in accordance with an embodiment of the present invention.

Note that while the computer system 100 (FIG. 1A) and/or the computer system 150 are illustrated as having a number of components in a given configuration, in other embodiments the computer system 100 (FIG. 1A) and/or the computer system 150 include fewer components or additional components. Moreover, two or more components may be combined into a single component and/or a position of one or more components may be changed. For example, in some embodiments the techniques described below are implemented within existing modules in processor 110 (FIG. 1A) and/or processors 160.

We now describe embodiments of a technique for visually compositing a group of graphical objects. As an illustrative example, in the discussion that follows, the visual compositing is performed using one or more GPUs.

When a typical existing GPU renders a given pixel in an image, it may step through the layers of graphical objects that contribute to the given pixel. In general, each pixel in each graphical object that contributes to the given pixel has an alpha value associated with it. Note that this alpha value indicates the transparency (or equivalently, the opacity) of the pixels in a given graphical object.

If one of the pixels in the foremost graphical object that is to be displayed is not fully opaque, the corresponding pixels associated with graphical objects that are, at least in part, underneath this foremost graphical object may also be visible. In particular, the pixels in a graphical object that are partially obscured by one or more overlaying graphical objects may be modified by the combined characteristics (such as the opacities) of the corresponding pixels in these overlapping graphical objects.

For example, if the foremost pixel is 70% opaque, then the most that an underlying pixel can contribute to the resulting image is 30% (even if this underlying pixel is 100% opaque) because the summation of the contributions from these pixels would otherwise exceed 100%. In particular, for two levels in an image (such as a foreground and a background), visual compositing using this existing technique can be expressed as $$R = L[0] \cdot A[0] + L[1] \cdot (1 - A[0]),$$

where R is the result of the visual compositing operation, L[n] is a pixel in layer n (with '0' defined as the foremost layer and '1' defined as the background layer), and A[n] is the alpha value associated with the pixel in layer n (which indicates the transparency of this pixel). Note that because the graphical object in the background layer is by definition opaque, the alpha value for the graphical object in the background layer in this example may be defined as 1.

As shown in Table 1, which provides pseudo-code for processor instructions, this existing technique can be extended to composite graphical objects in multiple layers to form a group composition.

TABLE 1

| | |
|---|---|
| K = 1; | |
| R[0] = L[0] * A[0] * K; | // Foreground Layer |
| K = K - A[0] * K; | |
| R[1] = L[1] * A[1] * K; | // First mid-ground layer |
| K = K - A[1] * K; | |
| R[2] = L[2] * A[2] * K; | // Second mid-ground layer |
| K = K - A[2] * K; | |
| R[n] = L[n] * A[n] * K; | // n'th mid-ground layer |
| K = K - A[n] * K; | |
| R[n + 1] = L[n + 1] * 1.0 * K; | // Background layer (alpha defined as 1.0) |
| Result = Sum ( R[0] ... R[n + 1] ) | |

If there is a need to composite several group compositions together (each of which is associated with a given group of graphical objects), the operations in Table 1 may be performed several times to create several group compositions (in a first pass). Then, these operations may be performed again (in a second pass) to create the final composition. Unfortunately, this two-pass process can degrade performance because of the pipelined nature of many existing GPUs. In addition, performance may be degraded because all group compositions may need to be completed before the final visual compositing operation can begin. In particular, note that if there are an arbitrary number of levels in a hierarchy, many of the existing visual compositing techniques may include an arbitrary number of passes, with a commensurate impact on performance.

This problem in many of the existing visual compositing techniques is illustrated in Table 2, which provides pseudo-code for processor instructions that visually composite three groups of graphical objects, which each include three layers or three graphical objects, into group compositions. In this example, the layers are designated L[0 . . . 8], group compositions are designated G[0 . . . 2], and opacities or alpha values for the group compositions in the final result are designated B[0 . . . 2]. Note that in this example there are three separate visual compositing operations for generating the group compositions, one for each of the groups of graphical objects (which are sometimes referred to as 'render-to-texture' operations), and a fourth visual compositing operation to composite the three intermediate group compositions together.

TABLE 2

| | |
|---|---|
| K = 1; | // Group 0 = Composite layers 0..2 |
| R[0] = L[0] * A[0] * K; | |
| K = K - A[0] * K; | |
| R[1] = L[1] * A[1] * K; | |
| K = K - A[1] * K; | |
| R[2] = L[2] * 1.0 * K; | |
| G[0] = Sum ( R[0..2] ); | |
| K = 1; | // Group 1 = Composite layers 3..5 |
| R[3] = L[3] * A[3] * K; | |
| K = K - A[3] * K; | |

TABLE 2-continued

| | |
|---|---|
| R[4] = L[4] * A[4] * K; | |
| K = K - A[4] * K; | |
| R[5] = L[5] * 1.0 * K; | |
| G[1] = Sum ( R[3..4] ); | |
| K = 1; | // Group 2 = Composite layers 6..8 |
| R[6] = L[6] * A[6] * K; | |
| K = K - A[6] * K; | |
| R[7] = L[7] * A[7] * K; | |
| K = K - A[7] * K; | |
| R[8] = L[8] * 1.0 * K; | |
| G[2] = Sum ( R[6..8] ); | |
| J = 1; | // Second Pass: Composite Groups 0..2 together |
| R[9] = G[0] * B[0] * J; | |
| J = J - B[0] * J; | |
| R[10] = G[1] * B[1] * J; | |
| J = J - B[1] * J; | |
| R[11] = G[2] * 1.0 * J; | |
| Final = Sum ( R[9..11] ); | |

In the discussion that follows, by defining one or more groups of graphical objects in an image, and associating a given group opacity with each of these groups of graphical objects, prior to the visual compositing, the overall process can be simplified. In particular, the intermediate results may no longer be needed. This means the multiple-pass multi-layer hierarchical visual compositing process may become a single-pass multi-layer visual compositing process. Consequently, the render-to-texture operation(s) and storage of the intermediate result(s) may be eliminated. This technique for compositing one or more groups of graphical objects may reduce the delay in the rendering of the image and/or may reduce the use of resources, for example, by eliminating write and read operations associated with the determining of the intermediate results.

Figure 2:
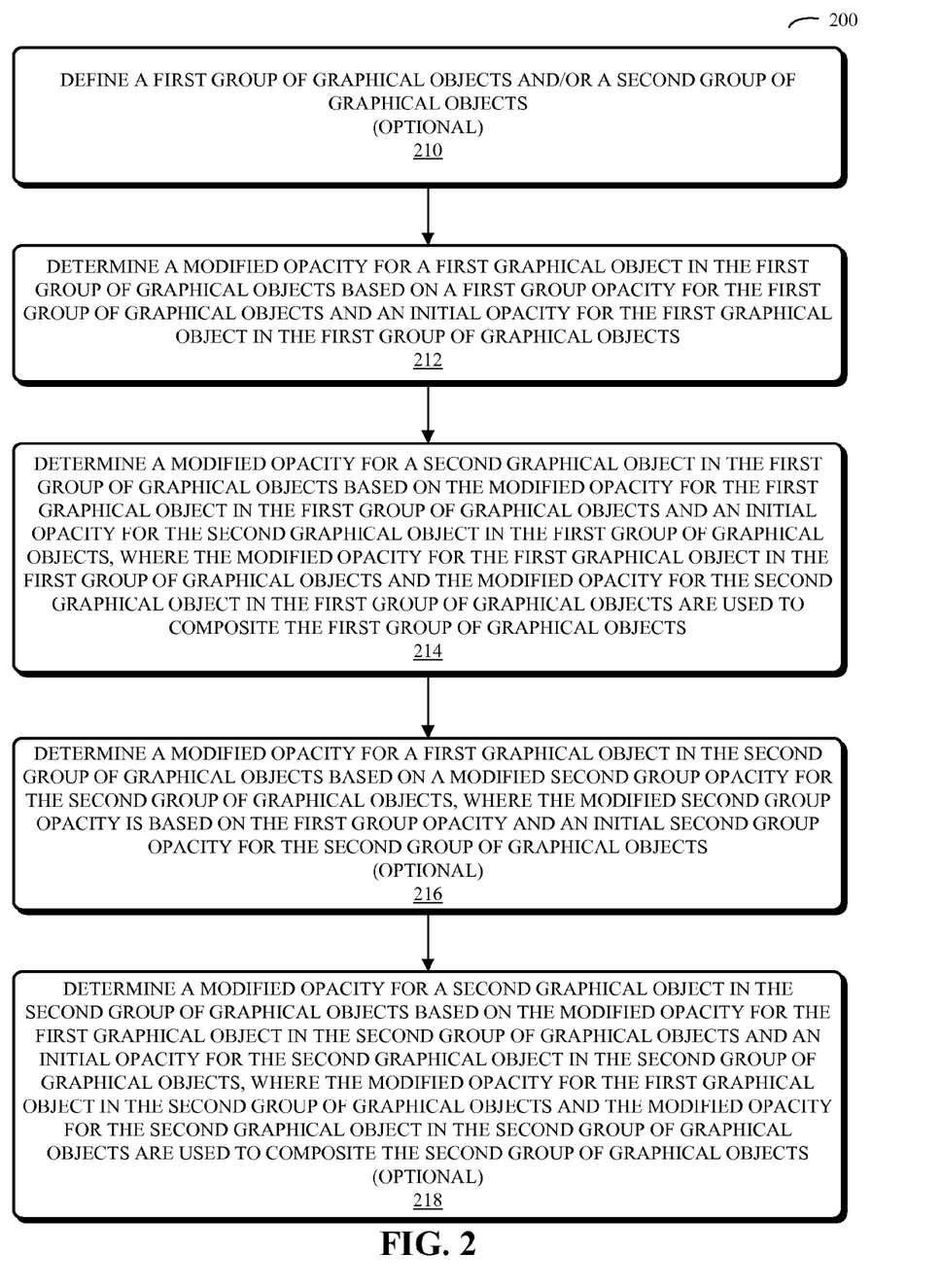
FIG. 2 is a flow chart illustrating a process for visually compositing a group of graphical objects in an image in accordance with an embodiment of the present invention.

FIG. 2 is a flow chart illustrating a process 200 for visually compositing a group of graphical objects in an image. During operation, a processor optionally defines a first group of graphical objects and/or a second group of graphical objects (210). Then, the processor determines a modified opacity for a first graphical object in a first group of graphical objects based on a first group opacity for the first group of graphical objects and an initial opacity of the first graphical object in the first group of graphical objects (212). Next, the processor determines a modified opacity for a second graphical object in the first group of graphical objects based on the modified opacity for the first graphical object in the first group of graphical objects and an initial opacity of the of the second graphical object in the first group of graphical objects (214), where the modified opacity for the first graphical object in the first group of graphical objects and the modified opacity for the second graphical object in the first group of graphical objects are used to composite the first group of graphical objects. For example, the first group of graphical objects may be composited with a background in the image.

However, if the image includes the second group of graphical objects, the processor may optionally determine a modified opacity for a first graphical object in the second group of graphical objects based on a modified second group opacity for the second group of graphical objects (216), where the modified second group opacity is based on the first group opacity and an initial group opacity of the second group of graphical objects. Then, the processor optionally determines a modified opacity for a second graphical object in the second group of graphical objects based on the modified opacity for the first graphical object in the second group of graphical objects and an initial opacity of the second graphical object in the second group of graphical objects (218), where the modified opacity for the first graphical object in the second group of graphical objects and the modified opacity for the second graphical object in the second group of graphical objects are used to composite the second group of graphical objects with the first group of graphical objects.

In some embodiments, at least a portion of the first object in the first group of objects does not overlap the second object in the first group of objects, in which case the modified opacity of the first object in the first group of objects is considered to be zero for those pixels that do not overlap.

Note that in some embodiments of the process 200 there may be additional or fewer operations. Moreover, the order of the operations may be changed and/or two or more operations may be combined into a single operation.

In an exemplary embodiment, the single-pass visual compositing technique is implemented by determining a modified opacity of a first graphical object in a first group of graphical objects based on a first group opacity for the first group of graphical objects and an initial opacity of the first graphical object in the first group of graphical objects. For example, the modified opacity for the first object in the first group of objects may equal a product of the initial opacity for the first object in the first group of objects and the first group opacity.

Moreover, a modified opacity for a second graphical object in the first group of graphical objects (which the first graphical object in the first group of graphical objects at least partially superimposes) may correspond to the difference between the first group opacity and the initial opacity for the first graphical object in the first group of graphical objects. For example, the modified opacity for the second graphical object in the first group of graphical objects may correspond to a product of an initial opacity for the second graphical object and the difference.

Additionally, a modified opacity of a first graphical object in an underlying group of graphical objects (which the first group of graphical objects at least partially superimposes) may be determined based on an initial group opacity for this underlying group of graphical objects and the modified group opacities for the preceding group(s) of graphical objects. For example, a modified opacity of a first graphical object in a second group of graphical objects may be determined based on an initial second group opacity for the second group of graphical objects and the first group opacity for the first group of graphical objects.

In some embodiments, the second group opacity corresponds to a difference between a maximum opacity value (such as 1) and the first group opacity.

By applying the group opacities during the visual compositing of the groups of graphical objects, the intermediate visual compositing operation or the rendering-to-texture operation may be eliminated from the final visual compositing operation and produce the same resulting image, thereby reducing the visual compositing operation to a single pass. This is illustrated in Table 3, which provides pseudo-code for processor instructions that visually composite three groups of graphical objects in a single-pass (as opposed to two-passes). Note that in this example, the first group opacity is initialized to the maximum value of 1.

TABLE 3

| | |
|---|---|
| J = 1; | // Composite layers 0..2 |
| K = B[0] * J; | |
| R[0] = L[0] * A[0] * K; | |
| K = K - A[0] * K; | |
| R[1] = L[1] * A[1] * K; | |
| K = K - A[1] * K; | |
| R[2] = L[2] * 1.0 * K; | |

TABLE 3-continued

| | |
|---|---|
| J = J - B[0] * J; | // Composite layers 3..5 |
| K = B[1] * J; | |
| R[3] = L[3] * A[3] * K; | |
| K = K - A[3] * K; | |
| R[4] = L[4] * A[4] * K; | |
| K = K - A[4] * K; | |
| R[5] = L[5] * 1.0 * K; | |
| J = J - B[1] * J; | // Composite layers 6..8 |
| K = 1.0 * J; | // Background object alpha is opaque (alpha = 1.0) |
| R[6] = L[6] * A[6] * K; | |
| K = K - A[6] * K; | |
| R[7] = L[7] * A[7] * K; | |
| K = K - A[7] * K; | |
| R[8] = L[8] * 1.0 * K; | |
| Final = Sum ( R[0..8] ); | |

In some embodiments, the compositing technique is modified to allow the use of graphical objects that are pre-multiplied by their associated opacities or alpha values. Moreover, in some embodiments the opacity or alpha value for the background in the image is not equal to 1. Additionally, algebraic optimizations, such as re-using common mathematical sub-expressions or eliminating multiplication by 1, can be further applied for the sake of efficiency.

Figure 3:
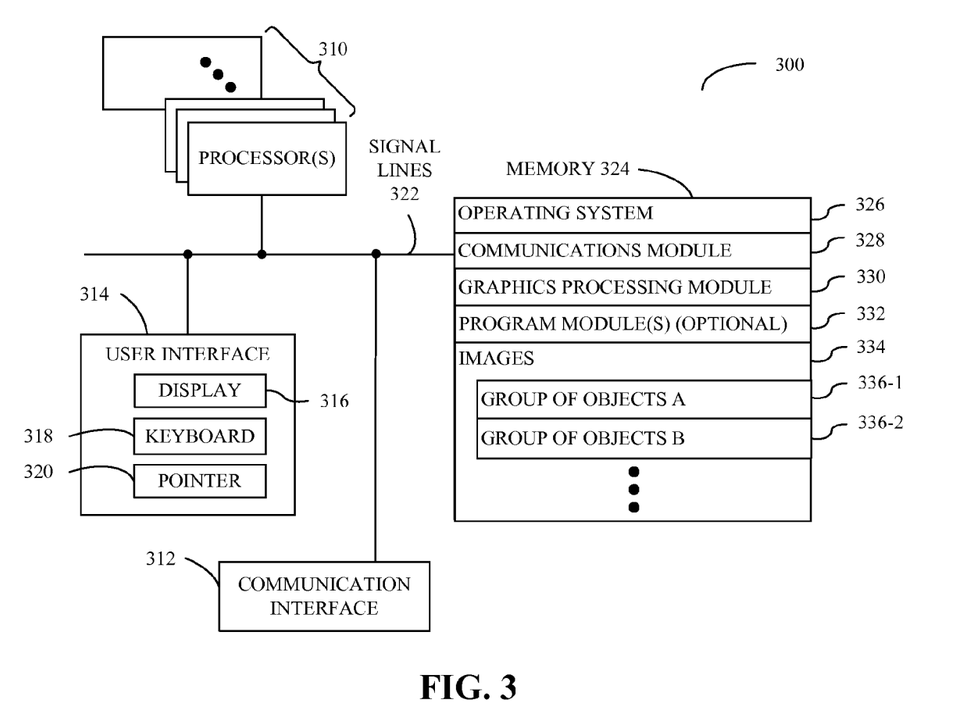
FIG. 3 is a block diagram illustrating a computer system in accordance with an embodiment of the present invention.

While the preceding embodiments have illustrated the use of one or more processors, such as one or more GPUs, to perform the single-pass visual compositing operation, in other embodiments the visual compositing may be performed by an application program (e.g., software) that is executed by a processor in a computer system. FIG. 3 is a block diagram illustrating such a computer system 300.

Computer system 300 includes: one or more processors 310 or processor cores (which may include one or more GPUs), a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to the computer system 300.

Memory 324 may include a graphics processing module 330 (or a set of instructions) which may perform the visual compositing technique, for example, on one or more groups of graphical objects (such as group of graphical objects A 336-1 and/or group of graphical objects B 336-2) in one or more images 334. In some embodiments, memory 324 includes one or more optional program modules 332 (or sets of instructions), which may perform the visual compositing technique.

Instructions in the various modules in the memory 324 may be implemented in: a high-level procedural language, an object-oriented programming language, and/or in an assembly or machine language. This programming language may be compiled or interpreted, i.e., configurable or configured to be executed by the one or more processing units 310.

Although the computer system 300 is illustrated as having a number of discrete items, FIG. 3 is intended to be a functional description of the various features that may be present in the computer system 300 rather than as a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component and/or a position of one or more components may be changed. In some embodiments the functionality of the computer system 300 may be implemented more in hardware and less in software, or less in hardware and more in software, as is known in the art.

While the preceding embodiments have describe a compositing operation as an illustrative example, in other embodiments the preceding technique may be used during a blending operation and/or during an anti-aliasing operation.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for visually compositing a group of objects in an image, comprising: using a computer to perform the operations of:
   - determining a modified opacity for a first object in a first group of objects based on a first group opacity for the first group of objects and an initial opacity for the first object in the first group of objects;
   - determining a modified opacity for a second object in the first group of objects based on the modified opacity for the first object in the first group of objects and an initial opacity for the second object in the first group of objects; and
   - determining a modified opacity for a first object in a second group of objects based on a group opacity for the second group of objects and an initial opacity for the first object in the second group of objects, wherein the group opacity for the second group of objects corresponds to a difference between a maximum opacity value and the first group opacity for the first group of objects;
   - wherein the first group of objects is at least partially superimposed over the second group of objects, and wherein the modified opacity for the first object in the first group of objects and the modified opacity for the second object in the first group of objects are used to composite the first group of objects.

2. The method of claim 1, wherein the first object in the first group of objects is at least partially superimposed over the second object in the first group of objects in the image.

3. The method of claim 1, wherein the modified opacity for the first object in the first group of objects corresponds to a product of the initial opacity for the first object in the first group of objects and the first group opacity.

4. The method of claim 1, further comprising initializing the first group opacity to a maximum value.

5. The method of claim 1, wherein the modified opacity for the second object in the first group of objects corresponds to the difference between the first group opacity and the modified opacity for the first object in the first group of objects.

6. The method of claim 1, wherein the modified opacity for the second object in the first group of objects corresponds to a product of the initial opacity for the second object and the difference between the first group opacity and the modified opacity for the first object in the first group of objects.

7. The method of claim 1, wherein the method is performed by a graphics processing unit.

8. The method of claim 1, wherein the modified opacity for the first object in the first group of objects and the modified opacity for the second object in the first group of objects are additionally used to composite the first group of objects with a background in the image.

9. The method of claim 1, further comprising:
   - determining a modified opacity for a second object in the second group of objects based on the modified opacity for the first object in the second group of objects and an initial opacity for the second object in the second group of objects, wherein the modified opacity for the first object in the second group of objects and the modified opacity for the second object in the second group of objects determine the compositing of the second group of objects with the first group of objects.

10. The method of claim 9, wherein the first object in the second group of objects is at least partially superimposed over the second object in the second group of objects in the image.

11. The method of claim 9, wherein the modified opacity for the second object in the second group of objects corresponds to the difference between the first group opacity, the modified second group opacity, and the initial opacity for the second object in the second group of objects.

12. A processor, comprising:
   - an instruction fetch unit within the processor configured to fetch:
     - instructions for determining a modified opacity for a first object in a first group of objects based on a first group opacity for the first group of objects and an initial opacity for the first object in the first group of objects;
     - instructions for determining a modified opacity for a second object in the first group of objects based on the modified opacity for the first object in the first group of objects and an initial opacity for the second object in the first group of objects; and
     - instructions for determining a modified opacity for a first object in a second group of objects based on a group opacity for the second group of objects and an initial opacity for the first object in the second group of objects, wherein the group opacity for the second group of objects corresponds to a difference between a maximum opacity value and the first group opacity for the first group of objects; and
   - an execution unit within the processor configured to execute the instructions for initializing and the instructions for determining;
   - wherein the first group of objects is at least partially superimposed over the second group of objects; and wherein the modified opacity for the first object in the first group of objects and the modified opacity for the second object in the first group of objects are used to composite the first group of objects.

13. The processor of claim 12, wherein modified the opacity for the second object in the first group of objects corresponds to the difference between the first group opacity and the modified opacity for the first object in the first group of objects.

14. The processor of claim 12, wherein the modified opacity for the second object in the first group of objects corresponds to a product of the initial opacity for the second object in the first group of objects and the difference between the first group opacity and the modified opacity for the first object in the first group of objects.

15. The processor of claim 12, wherein the processor is a graphics processing unit.

16. The processor of claim 12, wherein the modified opacity for the first object in the first group of objects and the modified opacity for the second object in the first group of objects are additionally used to composite the first group of objects with a background in the image.

17. A computer system configured to execute instructions to composite a group of objects in a processing unit, comprising:
a memory;
a processor;
an instruction fetch unit within the processor configured to fetch:
instructions for determining a modified opacity for a first object in a first group of objects based on a first group opacity for the first group of objects and an initial opacity for the first object in the first group of objects;
instructions for determining a modified opacity for a second object in the first group of objects based on the modified opacity for the first object in the first group of objects and an initial opacity for the second object in the first group of objects; and
instructions for determining a modified opacity for a first object in a second group of objects based on a group opacity for the second group of objects and an initial opacity for the first object in the second group of objects, wherein the group opacity for the second group of objects corresponds to a difference between a maximum opacity value and the first group opacity for the first group of objects; and
an execution unit within the processor configured to execute the instructions for initializing and the instructions for determining;
wherein the first group of objects is at least partially superimposed over the second group of objects; and
wherein the modified opacity for the first object in the first group of objects and the modified opacity for the second object in the first group of objects are used to composite the first group of objects.

18. The computer system of claim 17, wherein the modified opacity for the second object in the first group of objects corresponds to the difference between the first group opacity and the modified opacity for the first object in the first group of objects.

19. The computer system of claim 17, wherein the modified opacity for the second object in the first group of objects corresponds to a product of the initial opacity for the second object in the first group of objects and the difference between the first group opacity and the modified opacity for the first object in the first group of objects.

20. The computer system of claim 17, wherein the processor is a graphical processing unit.

21. The computer system of claim 17, wherein the modified opacity for the first object in the first group of objects and the modified opacity for the second object in the first group of objects are additionally used to composite the first group of objects with a background in the image.

* * * * *

UNITED STATES PATENT AND TRADEMARK OFFICE
CERTIFICATE OF CORRECTION

PATENT NO. : 8,446,426 B2
APPLICATION NO. : 12/110866
DATED : May 21, 2013
INVENTOR(S) : Jeffry E. Gonion Page 1 of 1

It is certified that error appears in the above-identified patent and that said Letters Patent is hereby corrected as shown below:

In the Claims

Col. 12, l. 31, in Claim 20, replace the term "graphical" with "graphics."

Signed and Sealed this
Second Day of July, 2013

Teresa Stanek Rea
*Acting Director of the United States Patent and Trademark Office*